United States Patent [19]

Gerry

[11] Patent Number: 4,552,119
[45] Date of Patent: Nov. 12, 1985

[54] MAGNETIC PULSE TIMER

[76] Inventor: Martin E. Gerry, 13452 Winthrope St., Santa Ana, Calif. 92705

[21] Appl. No.: 680,537

[22] Filed: Dec. 11, 1984

[51] Int. Cl.[4] .............................................. F02P 5/04
[52] U.S. Cl. .................................. 123/617; 123/651; 123/649; 123/476
[58] Field of Search ................ 123/617, 649, 651, 476

[56] References Cited

U.S. PATENT DOCUMENTS

| 2,924,633 | 2/1960 | Sichling | 123/617 |
| 3,073,879 | 1/1963 | Straub | 123/617 |
| 3,167,705 | 1/1965 | Sohner . | |
| 3,219,878 | 11/1965 | Konopa . | |
| 3,253,168 | 5/1966 | Robbins | 123/617 |
| 3,253,187 | 5/1966 | Short . | |
| 3,308,341 | 3/1967 | McLaughlin | 123/617 |
| 3,373,729 | 3/1968 | Lemen . | |
| 3,577,971 | 5/1971 | Cavil | 123/617 |
| 3,584,613 | 6/1971 | Kreil . | |
| 3,675,635 | 7/1972 | Graser . | |
| 3,675,636 | 7/1972 | Hini . | |
| 3,855,983 | 12/1974 | Valek . | |
| 3,861,370 | 1/1975 | Howard . | |
| 3,916,863 | 11/1975 | Hohne . | |
| 4,377,151 | 3/1983 | Gerry | 123/651 |

FOREIGN PATENT DOCUMENTS 956499  4/1964  United Kingdom ............... 123/649

Primary Examiner—Ronald B. Cox

[57] ABSTRACT

Improved magnetic pulse timer components provide increased timer voltages with steeper bipolar waveforms. Such improvements are residual in terms of a permanently magnetized timer rotor (30, 40, 60, 70, 80). Rotors (30, 40, 60) have regularly spaced protrusions at the rotor's outer periphery and are permanently magnetized. Rotors (70, 80) have regularly spaced slots in their outer peripheries and may also be permanently magnetized. Such slotted rotors provide the capability of high level and steep bipolar voltage waveforms. Additional magnetic flux switching capability in the timer may be provided by utilizing a permanently magnetized component mounting base plate (90, 100, 110).

3 Claims, 17 Drawing Figures

MAGNETIC PULSE TIMER

TECHNICAL FIELD

This invention is in the field of components for a magnetic pulse timer of an engine ignition system, particularly where such components are magnetized.

BACKGROUND ART

Magnetic pulse timers are commonly ued in automotive ignition systems. When driven by the engine's distributor shaft, a magnetic flux level is changed to induce a bipolar pulse pair in a sensing coil that triggers the ignition electronics between its on and off states. Such timers often exhibit reduced bipolar output and consequently slow pulse rise time that affects ignition performance in terms of reduced ignition transformer voltage output.

DISCLOSURE OF INVENTION

Increased magnetic pulse timer voltage output with steep bipolar pulse levels and accompanying higher ignition voltages are achieved by improvement in components of the magnetic pulse timer.

One form of improvement is in the timer's rotor member. In one case, the rotor, with protrusions regularly spaced at its outer periphery, is permanently magnetized so as to increase the magnetic flux in the timer and consequently the magnetic flux change due to rotor action. In a second case, the rotor has slots or notches at its outer periphery, instead of protrusions, so that instead of a flux build-up in the flux change process, there is a flux collapse at the leading edge of the slot and an immediate jump in flux intensity at the lagging edge of the slot to provide a very steep bipolar pair of pulses, as a function of slot narrowness, and makes possible the long sought after pin-point ignition system. Magnetizing the second named rotor increases the bipolar voltage amplitude approximately 50 to 75 percent, depending on rotational speed of the rotor.

Another improvement involves a permanently magnetized base plate on which the various timer components are mounted. Instead of being made of soft armature iron or steel, such plate is cast of an Alnico or other permanent magnet material. Since such base plate is part of the timer's magnetic circuit, it follows that its use will provide an increased residual flux for the rotor to act upon, developing a higher amplitude bipolar voltage pulse output.

BEST MODE FOR CARRYING OUT THE INVENTION

Figure 1:
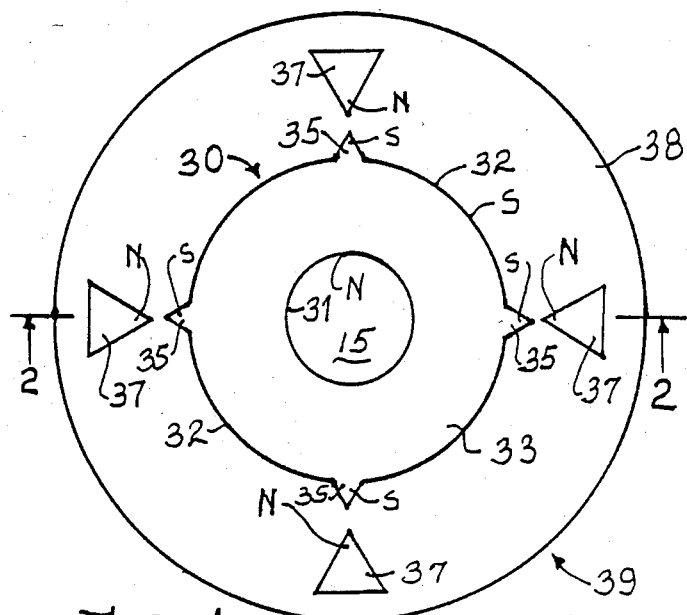
FIG. 1 is a plan view of the magnetic pulse timer in accordance with the invention.
Figure 2:
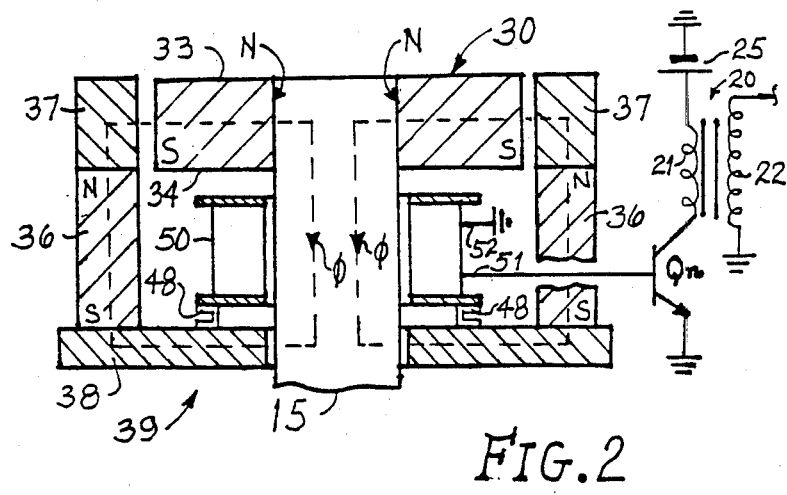
FIG. 2 is a cross-section view, partially in elevation, of the timer taken at plant 2—2 of FIG. 1.
Figure 7:
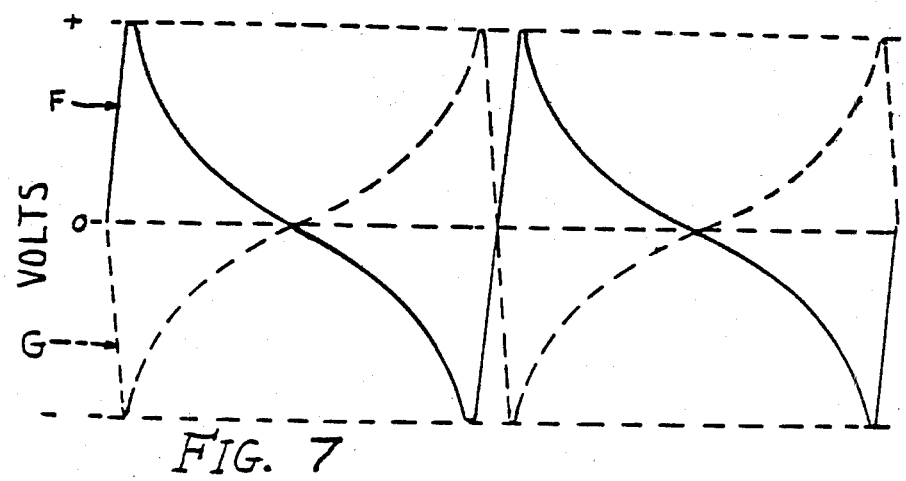
FIG. 7 represents bipolar waveforms obtained from a magnetic pulse timer.

Referring to FIGS. 1, 2 and 7, a magnetic pulse timer 39 has a permanently magnetized rotor 30, mounted on and driven by shaft 15 of the high voltage distributor, not shown, coupled to an internal combustion engine. A plurality of permanent magnets 36 are regularly spaced and circumferentially positioned about the outer periphery of the rotor, one such magnet for each ignition period or igniter used by the engine. Magnets 36 are attached to mounting base plate 38, which is made of armature steel or may be made of permanently magnetized material. The ends of magnets 36 are magnetically polarized respectively north N and south S. The north pole of each magnet 36 has a magnetizable pole piece 37, made of armature relay iron, attached thereto for guiding magnetic flux $\emptyset$ from magnets 36 through rotor 30, through shaft 15 and base plate 38 to complete one of the magnetic circuits. In this structure four magnetic circuits are provided, one per each ignition cycle or igniter used.

The circulating flux $\emptyset$ is sensed by sensor coil 50 wound on a bobbin, the ends of the coil being indicated as 51 and 52. Coil 50 is supported by bracket 48 between it and baseplate 38. In this illustration, coil end 52 is at ground potential and coil end 51 is connected to the base of a Darlington type transistor Qn such as type 2N6388. The collector of transistor Qn is connected to one end of primary winding 21 of ignition transformer 20, the other end of primary 21 being connected to DC source 25 for providing a charging current to the primary winding when transistor Qn is switched to its ON state by the positive pulse of the bipolar pulse pair F provided by timer 39. Secondary winding 22 is magnetically coupled to primary winding 21 to provide a high voltage to a distributor rotor, driven by shaft 15, for distribution of ignition voltages to a plurality of igniters in a predetermined sequence.

The position of rotor 30 determines the switching action of the magnetic pulse timer. Waveform F voltage output of the timer's sensing coil is used since transistor Qn is of the NPN type and requires a positive pulse at its base to turn Qn to the ON state so as to permit charging current to flow through winding 21. The charging period continues until the next-in-sequence negative pulse of the bipolar pulse pair arrives at the base of Qn turning the transistor to its OFF state and causing discharge of winding 21 through the inherent interelement capacity present in the Darlington transistor between its collector and emitter.

Such discharge induces a high electromotive force or voltage in primary winding 21 which is amplified by the turns ratio, generally between 90 and 100, of the ignition transformer, providing the high voltage across secondary winding 22 for distribution to the igniters.

Waveform F bipolar pulse pair is generated when permanently magnetized rotor 30, has its inner peripheral surface 31, synonymous with the mounting aperture for shaft 15, magnetized north N and its outer peripheral surface 32 magnetized south S. Regularly spaced protrusions 35, one per igniter in the engine, is consequently also magnetically polarized south S. In this rotor structure, the generally planar surfaces of the rotor are designated 33 and 34, but the flux paths $\emptyset$ are between the inner and outer peripheries and not the planar surfaces. To establish the flux paths $\emptyset$ it follows that pole pieces 37 will have their tips opposite the outer rotor peripheral surface of magnetic north N polarity. Shaft 15 and base plate 38 will also have to be of magnetic material to facilitate magnetic flux conduction therethrough.

It should be pointed out the the term permanent magnet or magnetized refer to ferromagnetic materials and ferromagnetism, and not to diamagnetic or paramagnetic materials or magnetism. Also non-magnetic materials are defined herein as any material not exhibiting ferromagnetic properties.

Permanent magnets may be made from a number of materials including ceramics. The following materials given in parts or percentage by weight, are suitable for permanent magnets for rotors and for the mounting base plate, discussed below.

Cobalt Steel: 55% iron, 35% cobalt, 6% tungsten, 3% chromium and 1% carbon.
Alnico: 50% iron, 25% nickel, 10% aluminum and 15% cobalt.
MK Steel: 70% iron, 22% nickel and 8% aluminum.
Ceramic Magnets or Ferrites: The formula $XFe_2O_4$, where X is an element selected from the group consisting of Cobalt, Nickel, Molybdynum or Iron, one part each.

A rotor made of Alnico or a ceramic material has to be cast while the Cobalt or MK Steel may be machined. These materials will provide flux densities between 7,000 and 10,000 gauss.

Hence, the additional magnetic flux provided by rotor 30 adds to the flux provided by magnets 36, and causes a larger flux quantity rate of change ($d\emptyset/dt$) when the rotor protrusions 35 pass pole pieces 37, than would occur when rotor 30 would not be permanently magnetized. Experiments have shown an increase between 50 and 75% in bipolar voltage output waveform F, depending on speed of rotation of rotor 30, as compared with the same ignition system not having a permanently magnetized rotor.

Figure 3:
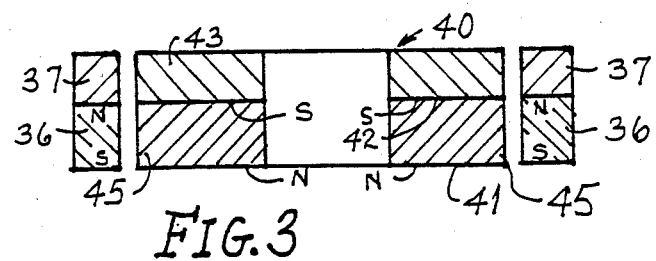
FIG. 3 is a cross-section view of a timer rotor and peripheral magnetic pole member in accordance with the invention.

Referring to FIG. 3, rotor 40 therein may be substituted for rotor 30 in the timer of FIGS. 1 and 2. Rotor 40 consists of a permanently magnetized rotor member having a pair of surfaces 41 and 42 which have respectively north and south magnetic polarities. This rotor member has protrusions 45, analogous to protrusions 35 of rotor 30, and a magnetizable armature plate 43 attached to surface 42 and conforming to the shape of the rotor member. Plate 43 is a means for directing the magnetic flux from the rotor member so that such flux is in the same flux path as the magnetic flux provided by magnets 36 through their respective pole pieces 37.

Figure 4:
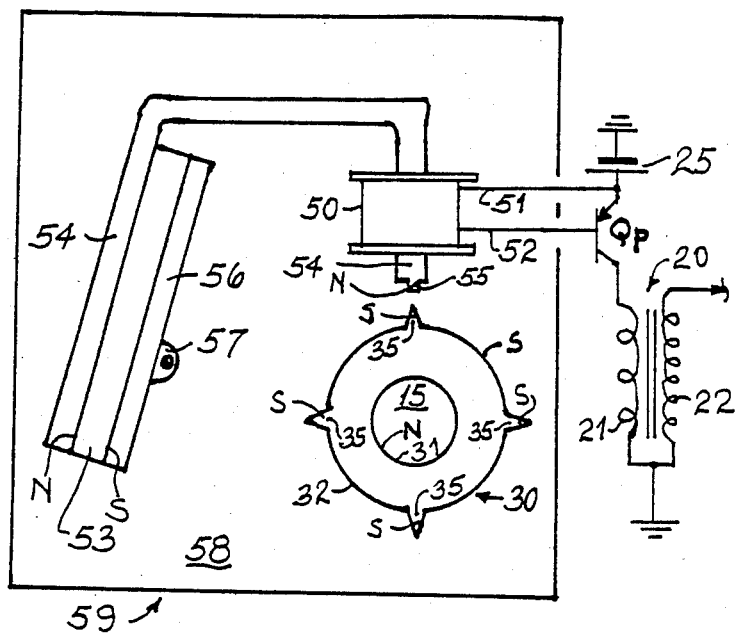
FIG. 4 is a plan view of another magnetic pulse timer, different from the timer of FIG. 1, showing the same rotor as in FIG. 1.

Referring to FIGS. 4 and 7, another magnetic pulse timer 59 is shown activating an ignition circuit consisting of primary winding 21 of ignition transformer 20 connected to the collector of Darlington transistor Qp of the PNP type, the emitter of Qp being connected to DC power source 25. Here, the base of Qp is connected to end 52 of sensing coil 50 and end 51 of coil 50 is at positive DC potential to maintain DC positive bias at the base of Qp and thus maintain Qp in its OFF state until the negative pulse of waveform G arrives at the base of Qp to turn Qp to its ON state and charge winding 21 with DC current flowing from power source 25. The PNP type transistor, here a type 2N6668, turns ON when its base is at negative potential with respect to its emitter, and turns OFF when its base is driven more positive than the emitter potential, effected by waveform G. It should be noted that the difference between waveform G and waveform F resides in reversal of leads 51 and 52 fed to the transistor input. When the next-in-sequence positive pulse of the bipolar pulse pair of waveform G arrives at the Qp base, Qp is switched OFF and a high voltage is induced in primary winding 21 causing a current flow through winding 21 and through inherent inter-element capacity of Qp. Such induced high voltage is transferred to secondary winding 22 and distributed to the igniters as was done in the case of FIGS. 1 and 2 situation.

Timer 59 is structurally different from timer 39, but is functionally similar. Here, the same rotor 30, as used in timer 39, may also be employed with the similar results as obtained from timer 39.

The magnetic flux of the timer, exclusive of the flux provided by rotor 30, is sourced by permanent ceramic magnet 53, its major planar faces being respectively magnetized north N and south S. The north face is attached to armature 54 about which sensor coil 50 is wound, the end of armature 54 having a protruding pole piece 55, which also takes on the north magnetic polarity. Since pole piece 55 is in the location at which magnetic flux will undergoe a change when protrusion 35 of rotor 30 is driven past such pole piece, the bipolar pulse pair will be induced in coil 50 in similar manner as discussed for the FIGS. 1 and 2 situation.

The south face of magnet 53 is attached to a magnetizable armature plate 56, such plate 56 being fastened by bracket 57 to magnetizable base plate 58.

Magnetic flux in the magnetic circuit of timer 59 will flow starting at north face N of magnet 53, through armature 54, through pole piece 55, through protrusion 35 of rotor 30, through magnetizable shaft 15, through base mounting plate 58, through armature plate 56 and back to the magnetic south face S of magnet 53 to complete the magnetic circuit each time protrusion 35 passes pole piece 55.

Figure 5:
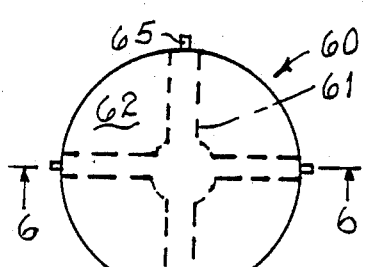
FIG. 5 is a plan view of a different rotor than shown in FIGS. 1, 2 and 3, used with the invention.
Figure 6:
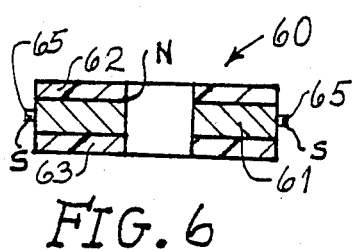
FIG. 6 is a cross-section view of the rotor taken at plane 6—6 of FIG. 5.

Referring to FIGS. 5 and 6, rotor 60 is usable in either timer 39 or 59, in place of rotor 30, with similar results.

Rotor 60 is comprised of permanent magnet web-shaped element 61 having a plural number of radial members extending towards the rotor's outer periphery. Such element 61 is embedded in plastic material such as a synthetic resin or non-magnetic material such as aluminum, shown here as upper and lower members 62 and 63. Each radial member has a protrusion 65 of the same magnetic material as element 61, located at the rotor's outer periphery. Such protrusions have magnetic south S polarities whereas the inner periphery of the rotor and element 61 has a magnetic north N polarity.

Figure 8:
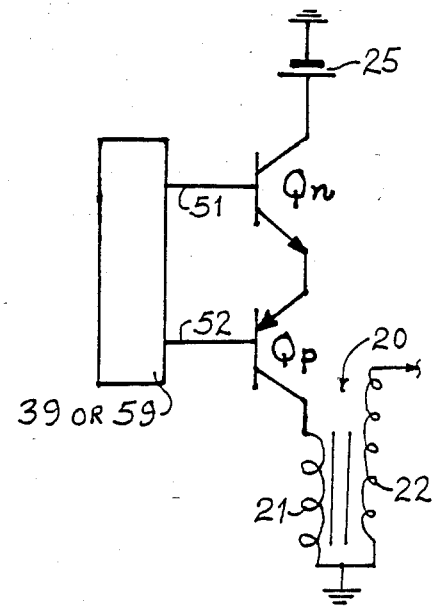
FIG. 8 shows the system of FIG. 2 or 4 operating an ignition system having output circuits of transistors of opposite conductivities serially connected to an ignition transformer, the input circuits of the transistors being connected to the sensing coil to the magnetic pulse timer.
Figure 9:
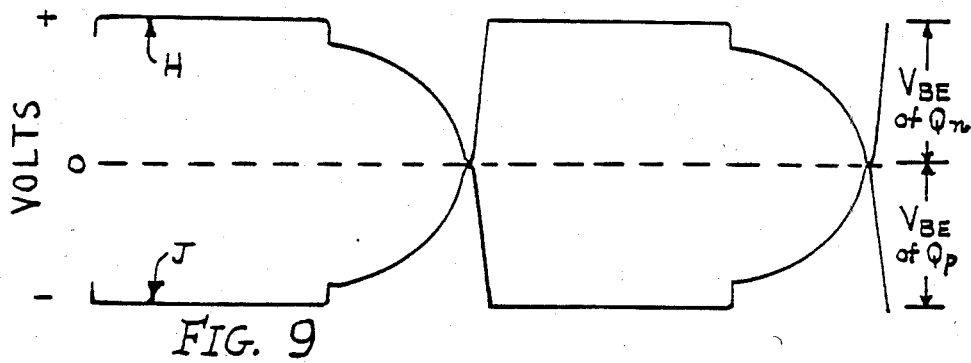
FIG. 9 shows waveforms of base to emitter voltages for the transistors of FIG. 8.

Referring to FIGS. 8 and 9, an ignition system is illustrated utilizing either pulse timer 39 or 59, operating in conjunction with a pair of Darlington type transistors Qn and Qp, such as types 2N6388 and 2N6668. The output circuits of these NPN and PNP type transistors are serially connected by connecting their emitters in series. A DC power source 25, the negative terminal of the power source being at ground potential, has its positive terminal connected to the collector of transistor Qn, the collector of transistor Qp being connected to one side of primary winding 21 of ignition transformer 20, the other side of the primary winding and one side of secondary winding 22 being commonly at ground potential, whereas the other side of secondary winding 22 is fed to a rotor member of a high voltage conventional distributor. The rotor of the distributor and rotor 30 are electrically insulated from each other though driven by the same shaft 15. In this ignition system coil end 51 of coil 50 is connected to the base of transistor Qn and coil end 52 of coil 50 is connected to the base of transistor Qp.

An advantage is realized by utilizing the circuits of Qn and Qp in that trigger actuation of such circuits by generation of either waveform F or G as input to Qn and Qp makes switching initiation independent of DC power source 25 voltage level providing a more reliable system.

The benefit of transistor pair Qn and Qp operation by activating and deactivating Qn and Qp simultaneously may be appreciated by examining their emitter-base voltages $V_{BE}$ illustrated as waveforms H and J in FIG. 9. During conduction of Qn the base to emitter voltage will drop from a positive voltage level to zero level, whereas the base to emitter voltage of Qp will rise from a negative voltage level to zero level, thereby resulting in a base to base voltage level which is double the base to emitter voltage of either Qn or Qp alone. Qn and Qp will simultaneously switch from their OFF to their ON states to permit charging of primary 21 rapidly. Discharge of charged primary 21 will occur when the next-in-sequence negative pulse of the bipolar pulse pair is applied to coil end 51, causing coil end 52 to be of positive polarity and simultaneously causing the base currents in both Qn and Qp to go to zero level, turning off Qn and Qp simultaneously.

Figure 10:
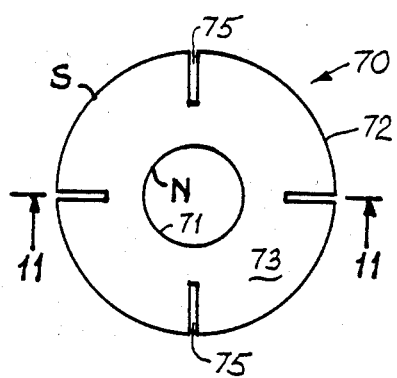
FIG. 10 is a plan view of a peripherally slotted rotor of a magnetic pulse timer, in accordance with the invention.
Figure 11:
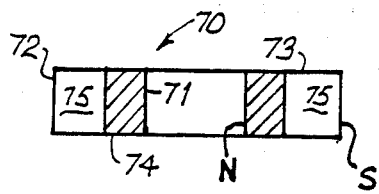
FIG. 11 is a cross-section view of rotor taken at plane 11—11 of FIG. 10.

Referring to FIGS. 10 and 11, rotor 70 different from rotors 30, 40 or 60, is provided for use in either timer 39 or 59 as a directly substitutable rotor. Such rotor still obeys Faraday's law of induction, inducing a voltage in coil 50 due to flux rate of change with time. Whereas with rotors 30, 40 or 60 the flux change occurred when a rotor protrusion past a stator pole piece bearing magnetic flux, the flux change using this rotor occurs when a slit, notch or slot 75 is driven past the pole piece 37 of timer 39 or the pole piece 55 of timer 59. Rotor 70 is permanently magnetized having its inner peripheral surface 71, also the aperture for coupling shift 15 thereto, magnetized north N polarity and its outer peripheral surfaces 72 magnetized magnetic south S polarity, so that magnetic flux lines will pass between the two peripheral surfaces parallel to the outer planar faces 73 and 74 of the rotor.

Figure 12:
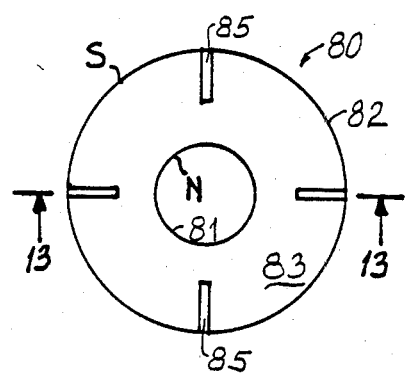
FIG. 12 is a plan view of the same rotor as in FIG. 10 except that the slots are filled with non-magnetic material.
Figure 13:
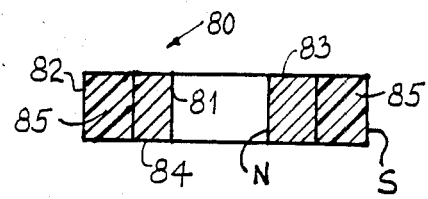
FIG. 13 is a cross-section view of the rotor taken at plane 13—13 of FIG. 12.

In the case of permanet magnet rotor 80, shown in FIGS. 12 and 13, such rotor will have similar inner and outer peripheral surfaces 81 and 82 and be similarly magnetized as rotor 70, the flux lines passing from surface 82 to surface 81 parallel to the rotor's planar faces 83 and 84. Slits, notches or slots 85 regularly spaced in the rotor's outer peripheral surface, are the same as slots 75 cf rotor 70 except that such slots have a synthetic resin material or a non-magnetic material therein to prevent dirt or other particulate matter accumulation. Such plastic or non-magnetic materials will not inhibit magnetic flux action in any way.

Hence rotors 70 or 80 will provide a bipolar pulse pair induced in sensor coil 50 every time slot 75 or 85 passes pole piece 37 or 55. However, here, in view of the narrow slots it is possible to obtain very sharp rise and fall times in the bipolar pulse pair waveform and thus obtain the long sought-after pin-point ignition performance. As the leading edge of slot 75 or 85 passes the pole piece, the magnetic flux from pole piece 37 or 55 and also from the outer peripheral surface 72 or 82 of the rotor is suddenly interrupted and the voltage of the bipolar pulse pair will suddenly go negative. When the lagging edge of the slot passes the pole piece, the rotor's outer periphery will again be in close proximity to the pole piece and the magnetic flux between the pole piece and outer periphery of the rotor is suddenly restored driving the voltage of the bipolar pulse pair to a high positive level. It follows that the bipolar pulse waveform steepness or rise and fall times of such waveform will be a function of the narrowness of the slots 75 or 85. In the case of rotors 30, 40 or 60, it is not possible to reduce the narrowness of the protruding pole member 35, 45 or 65 without limit and still maintain the rotor's structural integrity.

The foregoing rotors 70 or 80 were discussed as being permanently magnetized. However, these rotors made of magnetizable material such as armature or relay iron or steel and not of permanent magnet material, may be used in timers 39 or 59 and still obtain higher amplitude bipolar pulse voltages as compared with timers used by the prior art, in view of the decreased rise and fall times in the bipolar waveform achievable by the use of slots in the rotor, thereby providing an increased rate of flux change with time, $d\phi/dt$, in accordance with Faraday's law of induction.

Of course, with permanent magnetization, the rotor contributing an additional 7,000 to 10,000 gauss flux density, will provide this additional flux to be switched by rotor action, and will further increase the already higher bipolar voltage levels by 50 to 75%, depending on rotor speed and other timer design factors.

Figure 14:
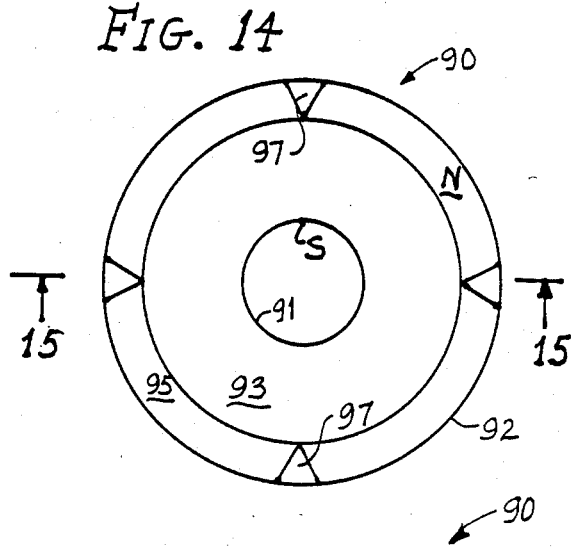
FIG. 14 is a plan view of timer components with emphasis on the timer component mounting base plate.
Figure 15:
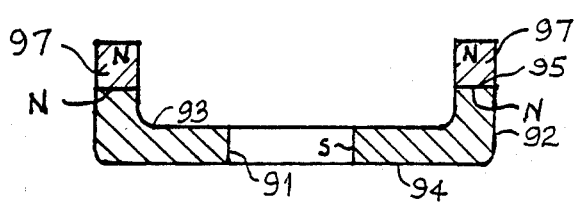
FIG. 15 is a cross-section view of the base plate taken at plane 15—15 of FIG. 14.

Referring to FIGS. 14 and 15, the component mounting base plate 90 of timer 39 may be made of permanent magnet material and be permanently magnetized. Such base plate having inner peripheral surface 91, which also is the aperture for admitting shaft 15, is magnetized magnetic south S. The outer edge 95 of base plate 90 is curled at the base plate's outer periphery 92, such edge having a magnetic north N polarity. Surfaces 93 and 94 of the base plate define its major faces used to mount related components. Permanently magnetized or non-permanently magnetized pole pieces 97 of magnetic material, are regularly spaced about the base plate outer periphery attached to edge or lip 95. Pole pieces 97 are analogous to pole pieces 37 of timer 39. Use of this component mounting base plate 90 of permanent magnetic material would easily add an additional 10,000 gauss of flux density to the timer's components and further increase the energy level output of the timer.

Figure 16:
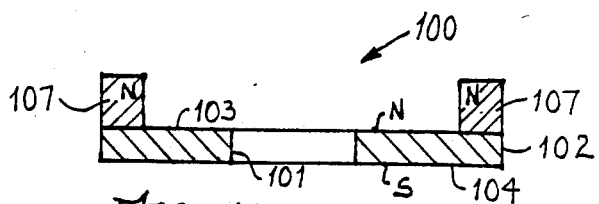
FIG. 16 is a cross-section view of another component mounting base plate, different from that of FIGS. 14-15.

Referring to FIG. 16, another variation of the mounting base plate is provided at 100, such base plate being permanently magnetized between its major planar surfaces 103 and 104, north and south magnetic polarities respectively. Base plate 100 has an inner periphery 101 also acting as means for admitting shaft 15 therethrough, and an outer peripheral edge at 102. Pole pieces 107 of permanent or non-permanent magnetic material are regularly spaced about the periphery 102 of plate 100 and are attached to surface 103.

Figure 17:
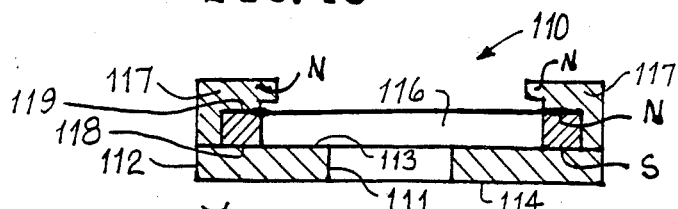
FIG. 17 is a cross-section view of a mounting base plate, similar to that of FIG. 16, and including a permanent ring magnet and magnet retaining pole pieces.

Referring to FIG. 17, still another variation of the mounting base plate is provided at 110, such base plate being made of magnetizable material and having an inner periphery 111 and an outer periphery 112 with major planar parallel surfaces 113 and 114. A permanent magnet ring 116 having parallel faces 118 and 119 respectively of south and north magnetic polarities, is retained by a plurality of pole pieces 117. Ring surface 118 is in cooperation with surface 113 of the base plate and ring surface 119 is in cooperation with pole pieces 117, thus providing a north magnetic polarity at each pole piece end. Pole pieces 117 are analogous to pole pieces 37 of timer 39. Hence, ring 116 magnetizes the base plate and provides an additional magnetic flux source in timer's magnetic circuit.

Inasmuch as mounting component base plates may require some machining, the cobalt steel and the MK steel materials would be usable as base plates for the structures shown at 90 and 100 in FIGS. 14, 15 and 16.

I claim:

1. A rotor for a magnetic pulse timer of an ignition system used by a fuel burning engine, characterized by:
   a single piece rotor of permanently magnetized material coupled to said engine for rotation about its central cylindrical axis, said rotor having inner and outer peripheral edges of opposite magnetic polarities and regularly spaced slots at the outer edge where the magnetic polarity is the same across the slots at said outer peripheral edge, said slots being generally parallel to the axis and including non-magnetic material retained in said slots, said slots dividing the outer edge into a plurality of segments wherein each of the segments is greater in width than any of the slots.

2. A rotor for a magnetic pulse timer of an ignition system used by a fuel burning engine, characterized by:
   a single piece rotor of permanently magnetized material coupled to said engine for rotation about its central cylindrical axis, said rotor having inner and outer peripheral edges of opposite magnetic polarities and regularly spaced slots at the outer edge where the magnetic polarity is the same across the slots at said outer peripheral edge, said slots being generally parallel to the axis and including non-magnetic matter in said slots, said slots dividing the outer edge into a plurality of segments wherein each of the segments is greater in width than any of the slots.

3. A rotor for a magnetic pulse timer of an ignition system used by a fuel burning engine, characterized by:
   a single piece rotor of magnetic material coupled to said engine for rotation about its central cylindrical axis, said rotor having inner and outer peripheral edges of opposite magnetic polarities and regularly spaced slots at the outer edge where the magnetic polarity is the same across the slots at said outer peripheral edge, said slots being generally parallel to the axis and including non-magnetic substance in said slots, said slots dividing the outer edge into a plurality of segments wherein each of the segments is greater in width than any of the slots.

* * * * *